United States Patent [19]

Krug

[11] 4,130,948

[45] Dec. 26, 1978

[54] SHOE INSERT

[75] Inventor: Hans-Dietrich Krug, Heidelberg, Germany

[73] Assignee: Firma Carl Freudenberg, Weinheim, Germany

[21] Appl. No.: 828,009

[22] Filed: Aug. 25, 1977

[30] Foreign Application Priority Data

Sep. 2, 1976 [DE] Fed. Rep. of Germany ... 7627371[U]

[51] Int. Cl.$^2$ .......................... A43B 13/38; B32B 3/26
[52] U.S. Cl. ......................................... 36/44; 428/305; 428/315
[58] Field of Search ................. 428/80, 304, 305, 310, 428/315; 36/44, 43

[56] References Cited

U.S. PATENT DOCUMENTS

| | | | |
|---|---|---|---|
| 3,170,250 | 2/1965 | Scholl | 36/44 |
| 3,608,006 | 9/1971 | Hosoda et al. | 428/315 |
| 3,734,811 | 5/1973 | Small et al. | 428/315 |
| 4,053,341 | 10/1977 | Kleiner et al. | 428/315 |

*Primary Examiner*—William J. Van Balen
*Attorney, Agent, or Firm*—Sprung, Felfe, Horn, Lynch & Kramer

[57] ABSTRACT

A shoe having a multi-layered insert disposed in said shoe against the shoe sole, said insert formed of a closed-cell, cross linked polyolefin foam, said insert having zones of different resiliency.

1 Claim, No Drawings

SHOE INSERT

BACKGROUND OF THE INVENTION

1. Field of the Invention

This invention relates to a shoe insert for use in shoes. More especially, this invention relates to a plastic shoe insert especially for use as a foot bed in shoes. Still more especially, this invention relates to a multi-layered insert for use as a foot bed in shoes, which insert is made of a closed-cell, cross linked polyolefin foam of differing degrees of elasticity, especially through its thickness.

2. Discussion of the Prior Art

It is known that, especially when one is constantly walking on hard floors or paving, severe phenomena of fatigue affect the feet and legs, and can be considered as symptoms of excessive strain. The physical consequences of such strain are by no means negligible, and since there are numerous occupations which are practiced entirely or chiefly on foot, and which are accompanied by a disproportionate frequency of foot ailments, the need has long been felt for an effective and practical preventative remedy therefor.

For the solution of this existing problem, insoles of plastic or of reinforced leather fiber materials have been developed which are precisely fitted anatomically to the foot to be treated. However, their use by persons considered to have healthy feet has proven to be rather unattractive, and their high cost has limited the use of such insoles to cases in which the foot damage caused by stress has already been done. This solution has proven also to be rather unsatisfactory from the purely commercial point of view.

Under normal conditions, the foot performs to a great extent the function of a vibration damper for the unavoidable shocks produced by walking, and it is considerably impaired in this function precisely by the wearing of an insole. Its use is therefore to be equated with interference with the body's own system for vibration damping, and since the shock stress of itself continues to remain the same, overstrain is to be expected to appear in other body members such as the tibia, for example. In addition to the disadvantages of cost and physiological disadvantages, however, there are also obvious esthetic reasons which militate against the more widespread use of such insoles. For example, high-fashion footwear often makes it impossible to use them.

SUMMARY OF THE INVENTION

It is an object of this invention to provide a shoe insert, especially for use as a foot bed in shoes, which overcomes these disadvantages and which, despite the use of a standard series of sizes, provides the foot with resilient support in a controlled manner, thereby preventing premature fatigue symptoms or physical damage.

The problems of prior art shoe inserts are solved in accordance with the present invention which provides a shoe insert for use as a foot bed in shoes, which shoe insert is a multi-layered insert to be disposed in said shoe with one layer against the shoe sole, said insert being formed of a closed-cell, cross linked polyolefin foam, said insert having zones of different elasticity. The shoe inserts have the known configuration corresponding to the shape of the shoe interior. Preferably, the shoe inserts are formed of multi-layers of polyolefin foams, especially $C_2$–$C_8$ polyolefin foams. Foams useful in accordance with the invention include both polyolefin homopolymeric foams as well as polyolefin copolymeric foams. The chemical composition of the foam is of secondary importance to the physical properties of the respective layers, especially the specific gravity.

It is to be understood that the shoe insert has the same general configuration in terms of shape as heretofore employed. It is made up, preferably, of several layers of polyolefin foam of different resiliency, e.g., elasticity. These layers can, if desired, be secured to one another by a laminating technique. Alternatively, the layers can be simply physically disposed one on top of another. The inventive concept resides in the nature of the materials and not in their physical interrelationship to the other parts of the shoe.

In a special development, provision is made such that the zones of different resiliency consist of polyolefin foams of varying thickness and/or specific gravity, which are laminated together, the laminating being effected in a known manner. It is desirable to use as the polyolefin foams closed-cell, crosslinked polyethylene foams, materials of higher specific gravity provided in the useful top surfaces than in the area of the core surfaces. Those polyethylene foams having specific gravities of 0.06 to 0.175 in the useful surfaces, and specific gravities of 0.03 to 0.08 in the core areas have proven to be of particular advantage.

The subject of the invention, however, is not limited to these special embodiments, and it is, of course, possible to satisfy special requirements by modifications thereof or combinations thereof with known elements.

The method described below can be used, for example, for the preparation of the shoe insert of the invention: In a first step, the different sheets of the closed-cell polyolefin foam can be associated with one another in the desired manner and, by the use of known laminating methods, such as flame lamination, can be bonded together. With regard to the selection, it has proven desirable to provide sheets such that when laminated the specific gravity of the respective foam sheets increases from the bottom side to the (top) useful side. It is especially desirable for the useful (top) side to be formed of a polyolefin foam having a specific gravity between 0.06 and 0.175.

A number of advantages result from this special type of construction, which are especially important to the utility of the shoe insert of the invention. First to be named in this regard is the extremely good adaptability of the shoe insert to the foot of the wearer, combined with a high, controlled supporting action. The relatively great hardness of the foam layer covering the shoe insert (the layer averted from the top) not only assures the achievement of sufficient strength in relation to mechanical stress, but also avoids the undesirable spongy softness of the known open-pore foams which, in addition to the insufficiently controlled supporting action, make such foam materials unsuitable for this application due to the fact that they block the circulation of air within the shoe.

The shoe insert of the invention has a progressive damping action against dynamic stresses such as occur, for example, in walking upon hard floors, and this is very desirable. Furthermore, due to its poor moisture absorptivity, it has a uniform and very high insulating action.

The special properties of the shoe inserts of the invention are basically achieved merely by making it in the manner described above. These properties, however, can be modified, if desired, by bonding them additionally to a textile fabric or to artificial leather or by other surface improvement measures. For example, for the use of the shoe insert of the invention as an element of construction in the fashion shoe industry, such modifications are often desirable.

The shaping of the shoe insert of the invention from the sheet material is performed after previous heating in a special tool. After removal from the mold and final cooling, the piece is directly usable, and can be further worked in a conventional manner by cementing, welding or stitching. However, after special fashioning, it can also be used in loose form like insoles of the prior art.

What is claimed is:

1. A shoe having a multi-layered insert disposed in said shoe against the shoe sole, each of the layers of said insert formed of a closed-cell, cross linked polyolefin foam, said layers having different resiliency from on another, the layer of said insert disposed against the shoe sole having a specific gravity of 0.03 to 0.08 and the layer of said insert to be disposed against the foot of the user having specific gravity of 0.06 to 0.175, the specific gravity of the respective layers increasing progressively from the layer disposed against the shoe sole to the layer to be disposed against the user's foot, said shoe insert conforming to the shape of said shoe.

* * * * *